United States Patent [19]

Yamada

[11] 4,033,645
[45] July 5, 1977

[54] BEARING DEVICE

[75] Inventor: Tomio Yamada, Nara, Japan

[73] Assignee: Koyo Seiko Company, Limited, Osaka, Japan

[22] Filed: Apr. 26, 1976

[21] Appl. No.: 680,504

[52] U.S. Cl. .......................................... 308/207 A
[51] Int. Cl.² ........................................ F16C 35/06
[58] Field of Search ....... 308/207 R, 207 A, 189 R, 308/189 A

[56] References Cited

UNITED STATES PATENTS

| 2,972,504 | 2/1961 | Baker | 308/207 A |
|---|---|---|---|
| 3,156,506 | 11/1964 | Scheifele et al. | 308/207 A |
| 3,716,280 | 2/1973 | Leibensperger et al. | 308/207 A |

Primary Examiner—Joseph F. Peters, Jr.
Assistant Examiner—Gene A. Church
Attorney, Agent, or Firm—Mason, Fenwick & Lawrence

[57] ABSTRACT

A device comprising a sleeve-like outer member to be fixedly fitted in a bore of a housing, an annular inner member of L-shaped section having a flange secured to one end of the outer member, with an annular pressure chamber provided between the outer member and the inner member for receiving a pressure fluid, an outer ring of a roller bearing fitted in the outer member slidably only in an axial direction and having a cylindrical portion axially extending from its one end having a smaller inside diameter, the outer ring having its cylindrical portion slidably fitted in the pressure chamber, and sealing means for sealing clearances between the cylindrical portion and the outside and inside surfaces defining the pressure chamber and in sliding contact with the cylindrical portion, whereby the pressure of the fluid within the pressure chamber is axially applied directly to the outer ring to automatically adjust the preload on the bearing including the outer ring.

5 Claims, 4 Drawing Figures

BEARING DEVICE

BACKGROUND OF THE INVENTION

The present invention relates to bearing devices, and more particularly to bearing devices of the preload adjustable type in which the preload to be applied to the bearing is positively and properly variable with changes in the rotation conditions and loading conditions of the bearing.

Generally preload-adjustable roller bearings are adapted to carry radial and thrust loads. To improve the accuracy of rotation and rigidity of the bearing system for supporting a rotary shaft, the bearing is subjected to an axial preload and operated in the preloaded condition in which the clearances between the constituent members of the bearing are negative.

The amount of preload to be given to such bearing must be properly determined in accordance with the kind and amount of the load acting on the bearing, the speed of rotation of the bearing, accuracy of rotation required of the shaft, etc. However even if the bearing is given a proper initial preload when mounted on the rotary shaft and installed in a housing, it becomes frequently necessary during rotation of the bearing to greatly alter the operating conditions of the machine in which the bearing is incorporated, consequently varying the rotational speed of the shaft and the load acting on the bearing and entailing thermal expansion of the shaft, housing, etc. due to heat generation. As a result, the initial preload is seldom maintained as a proper preload always during and after rotation of the bearing, and the acting preload may become excessive or insufficient, adversely affecting the rotation accuracy and performance of the bearing. Even during the rotation of bearing, furthermore, there arises the necessity of properly adjusting the preload with changes in the speed of rotation and the load on the bearing.

Accordingly in order to render the preload-adjustable roller bearing rotatable with improved accuracy and rigidity while supporting a rotary shaft, it is required to properly adjust the preload always in accordance with changes in the conditions involved during rotation.

A construction overcoming the above problem is known in which a preload-adjustable roller bearing for supporting a rotary shaft is installed in the housing of a machine portion, with the outer ring loosely fitted in the housing bore, the housing accommodating a pressing member for pressing and sliding the outer ring axially thereof and a member defining a pressure chamber having the pressing member as a movable member to apply the static pressure of a fluid to the pressing member so as to adjust the preload by altering the pressure of the chamber with changes in the speed of rotation of the bearing, bearing load and like conditions. However, because the outer ring subjected to the preload is adapted to be pushed by the fluid pressure through the pressing member which is separately made, the constituent members are likely to involve inaccuracies when they are machined and assembled. Moreover, the outer ring of the bearing loosely fitted in the housing has a usual axial dimension, namely the cylindrical outer ring surface in sliding contact with the inside surface of the housing has a short axial length, so that the outer ring inclines due to the clearance of loose fit to distort the sliding contact surfaces, consequently making it difficult or impossible to adjust the preload, or leading to uneven contact between the raceway surface of the outer ring and the rolling contact surfaces of the rolling elements. A serious trouble will then occur in the bearing. The above-mentioned inaccuracies involved in the assembling distortion of the sliding contact surfaces of the housing and the outer ring combine with irregularities in the dimensional accuracy of the constituent members, resulting in aggravated imperfections. Moreover, since the bearing device is not provided with means for preventing the rotation of the outer ring fitted in the housing, creeping takes place during rotation of the bearing, producing wear on the sliding contact surfaces of the outer ring and housing as well as on the contact surfaces of the outer ring and pressing member and impairing accurate contact between these contact surfaces. This leads to misalignment of the pressing member relative to the outer ring and/or deteriorates the perpendicular relation of the contact surfaces of the outer ring and pressing member to the axis thereof, adversely affecting the accurate rotation and preload adjustment of the bearing. When creeping becomes pronounced, the metal-to-metal sliding friction between the foregoing sliding contact surfaces and between the contact surfaces causes wear or heat generation, which reduces accuracies of the outer ring and/or the pressing member, seriously impeding the axial sliding movement of the outer ring to make it more difficult to adjust the preload.

U.S. Pat. No. 3,716,280 of R. L. Leibensperger et al. discloses a bearing device including a pressing member bearing against the large diameter end faces of tapered rollers to press the rollers axially thereof and a member defining a pressure chamber having the pressing member as a movable member for applying the static pressure of a fluid to the pressing member. However since the movable pressing member bears against the large diameter end faces of rolling tapered rollers, the accuracy of rotation of the bearing is adversely affected by a reduction in the perpendicularity, relative to the bearing axis, of the surface of the pressing member bearing against the end faces of the rollers when the pressing member slidingly moves in the axial direction and/or by a change in the position of contact between the pressing member and the large diameter end faces of the rollers due to the radial displacement of the pressing member. Moreover, such special construction is usable only in a greatly limited types of bearings. Furthermore, it is very difficult to machine the end surface of the pressing member to be contacted with the tapered rollers, since the surface must have the desired angle of contact and curvature with high precision. In addition, the pressing member needs to be inserted into an extremely confined annular space between the inner periphery of large diameter portion of the outer ring and the outer periphery of large diameter portion of a cage so as to be held in contact with the large diameter end faces of the tapered rollers. The thickness of the pressing member is consequently restricted, possibly leading to insufficient rigidity.

Thus conventional preload-adjustable bearing devices and means for varying the preload on the bearing have various drawbacks in practical uses and are not adapted for proper preload adjustment with good responsiveness in accordance with preload setting conditions such as rotation of bearing, load thereon and the like.

SUMMARY OF THE INVENTION

An object of this invention is to overcome various drawbacks of bearings of the type described and to provide a bearing in which the preload to be given to the bearing is properly and automatically adjustable as desired in accordance with changes in the preload setting conditions during rotation of the bearing.

Another object of this invention is to provide a device in which the outer ring of a bearing housed in a case is smoothly and stably slidable within the case axially thereof to ensure preload adjustment with greater ease.

Still another object of this invention is to provide a device including a pressure chamber of extremely simplified construction for receiving a pressure fluid to press the bearing outer ring for preloading and simplified means for applying the pressure of the fluid to the outer ring so that the device can be fabricated from a reduced number of parts by easy machining and assembling procedures with high precision.

Still another object of this invention is to provide a bearing device of the foregoing type as a unit to render the device easily installable in machines for the ease of handling.

Still another object of this invention is to completely prevent creeping of the outer ring to be fitted in a case to prevent wear on the sliding contact surfaces thereof and to ensure high precision and rigidity of the bearing device over a prolonged period of time.

In a bearing device including a bearing capable of carrying radial and thrust loads and a pressure chamber for receiving a pressure fluid to give a proper preload to the outer ring of the bearing by pressing the ring axially thereof, the above objects can be fulfilled by a construction comprising a sleeve-like outer member to be fixedly fitted in a housing and an annular inner member having an L-shaped section and including a flange, the outer member and the inner member being joined together by securing the outer peripheral portion of the flange of the inner member to one end surface of the outer member to provide the pressure chamber in the form of an annular space defined by the outside peripheral surface of cylindrical portion of the inner member and the inside surface of the outer member.

The outer ring of the bearing fits in the outer member slidably only in an axial direction. The outer ring has a cylindrical portion extending axially from and integral with its one end where the raceway thereof has a smaller diameter. The cylindrical portion of the outer ring slidably fits in the pressure chamber. Sealing means such as O-rings oiltightly seal the clearance between the inside surface of the outer member and the outer peripheral surface of the outer ring in sliding contact therewith and also the clearance between the outside peripheral surface of the cylindrical portion of the inner member and the inside peripheral surface of the cylindrical portion of the outer ring in sliding contact therewith. The outer member is formed at a suitable portion with a bore open to the pressure chamber for mounting means for feeding a pressure fluid such as oil.

Guide means is provided between the outer ring and the outer member for permitting the outer ring to slide only in the axial direction.

Due to the provision of the cylindrical portion extending axially from the small diameter end of the outer ring, the surface of the outer ring in sliding contact with the outer member has a greatly increased length. Thus the enlarged surface guides the outer ring for axial sliding movement. Moreover, the cylindrical portion which fits directly in the pressure chamber is adapted to receive the pressure of the fluid. Because of these advantages, the construction described is entirely free of objections to be otherwise involved in the axial sliding movement of the outer ring, such as distortion of the sliding contact surfaces relative to each other and inclination of the outer ring, thereby rendering the outer ring very smoothly slidable. As a result, the pressure of the fluid fed to the pressure chamber is variable with changes in the rotation conditions and loading conditions of the bearing, making it possible to properly maintain the preload on the bearing as desired. Moreover, with greatly improved efficiency of pressure transmission and adjustment, the outer ring is slidable as above with very high responsiveness in accordance with changes in the preload setting conditions.

According to this invention, the pressure chamber is defined by two members, namely the sleeve-like outer member and the annular outer member having an L-shaped section. These two members are extremely simple in shape, while the outer ring is integrally formed with the cylindrical portion for receiving the fluid pressure. Consequently even when very high dimensional accuracy is required of these parts, the parts can be machined as specified with extremely improved precision. This serves to eliminate such objection that the dimensional errors of the parts will combine to reduce the precision of the resulting assembly and also serves to reduce the number of the constituent parts.

Although the outer ring extends in its axial direction to provide the cylindrical portion at the small diameter end, the outer member can be made rather smaller in axial length than in conventional devices. Since the bearing is wholly accommodated within the outer member, the width of the resulting assembly is smaller than in conventional devices. According to this invention, therefore, the preload-adjustable bearing device of the type stated can be provided as a compact unit in which the whole parts are housed in the outer member. Because the assembled device is available with high precision, it is very convenient to handle; the user needs only to incorporate the device in position between a rotatable shaft and housing.

The guide means for guiding the axial sliding movement of the outer ring completely eliminates creeping of the outer ring, thus obviating wear, heat generation and reduction in precision owing to creeping.

Other objects and features of this invention will become more apparent from the following description.

DESCRIPTION OF THE PREFERRED EMBODIMENTS

Figure 1:
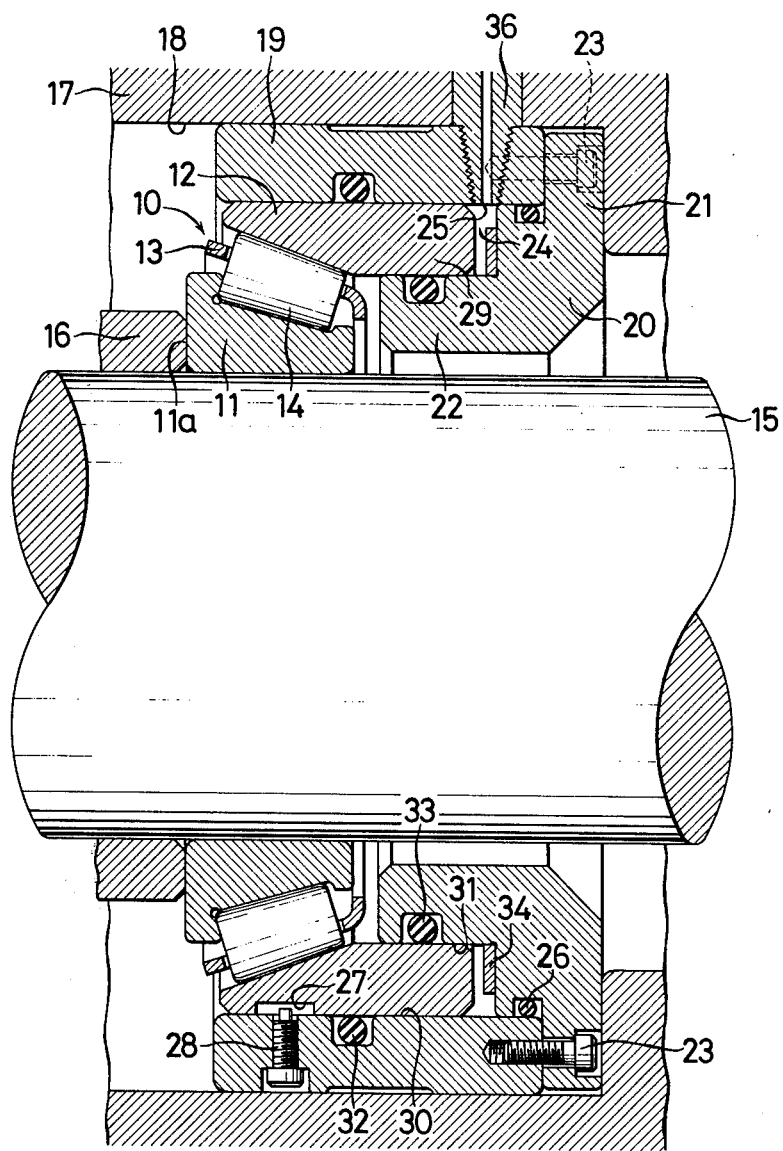
FIG. 1 is a front view in vertical section showing an embodiment of this invention.

FIG. 1 shows a tapered roller bearing 10 as a preload-adjustable bearing which can be subjected to radial and thrust loads at the same time. However, the bearing is replaceable by a ball bearing of the angular type or like other bearing. Thus the preload-adjustable bearing is not limited to the illustrated construction.

The tapered roller bearing 10, an example of preload-adjustable bearings, includes an inner ring 11 fixedly mounted on a shaft 15 and held against displacement, with its large diameter end face 11a in contact with a collar 16 or like positioning member secured to the shaft 15 or with the end surface of a stepped portion of the shaft (not shown). A plurality of tapered rollers 14 or like rolling elements are interposed between the inner ring 11 and an outer ring 12 and supported by a cage 13 as already known.

A sleeve-like outer member 19 fixedly fits in the bore 18 of a housing 17 in a machine portion. An annular inner member 20 of L-shaped section has a flange 21 secured to one end of the outer member 19 by bolts 23 or the like. Thus the two members 19 and 20 are joined together by the bolts 23 to provide, at one side of the outer member 19, an annular pressure chamber 24 defined by the inside surface of the outer member 19 and the outside surface of a cylindrical portion 22 of the inner member 20. The outer member 19 is formed with a bore having mounted therein a plug 36 for connecting an unillustrated duct serving as means for feeding a pressure fluid. The plug 36 has a fluid inlet 25 open to the pressure chamber 24. Sealing means such as O-ring 26 oiltightly seals the clearance between the contact surfaces of the outer member 19 and of the inner member 20.

The outer ring 12 of the bearing 10 fitting in the bore of the outer member 19 is slidable in an axial direction. A screw pin 28 screwed in the outer member 19 is engaged in an axial elongated groove 27 formed in the outside surface of the outer ring 12 to render the outer ring 12 slidable in the axial direction. The pin 28 serves as means for guiding the outer ring 12 in the axial direction and prevents rotation of the outer ring 12 to eliminate any creeping thereof. Alternatively, the guiding means may comprise a key and a key groove or the like suitable for guiding the axial movement.

The outer ring 12 has a cylindrical portion 29 extending axially from its small diameter end. The cylindrical portion 29 is inserted into the pressure chamber 24 between the outer member 19 and the cylindrical portion 22 of the inner member 20 and is slidable in the axial direction. Sealing means such as O-rings 32 and 33 respectively seal a clearance 30 between the inside surface of the outer member 19 and the outside surface of the outer ring 12 in sliding contact with each other and a clearance 31 between the outside peripheral surface of the cylindrical portion 22 of the inner member 20 and the inside surface of the cylindrical portion 29 of the outer ring 12 in sliding contact with each other. Although the O-rings 32 and 33 are supported by the outer member 19 and the inner member 20 respectively in the illustrated embodiment, the O-rings may be supported by the outer ring 12.

A spacer ring 34 is provided in the pressure chamber 24 to prevent the end face of the cylindrical portion 29 of the outer ring 19 from coming into intimate contact with the opposed entire bottom surface of the pressure chamber 24, namely from closing the fluid inlet 25.

Figure 2:
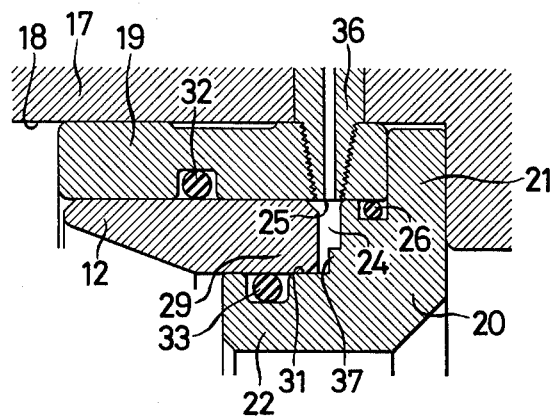
FIGS. 2 and 3 are fragmentary views in section showing means for forming a space within a pressure chamber used in place of the spacer ring in the pressure chamber of FIG. 1.
Figure 3:
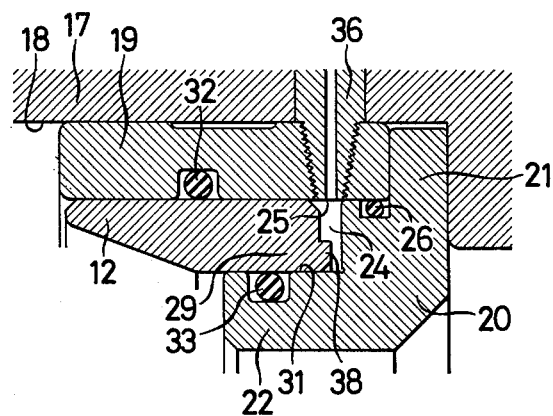

In place of the spacer ring 34 provided in the pressure chamber 24, the inside bottom surface of the pressure chamber 24 opposed to the end face of the cylindrical portion 29 of the outer ring 19 may be partially provided with an annular projection 37 projecting in the axial direction and integral with the inner member 20 as shown in FIG. 2. Alternatively, the end face of the cylindrical portion 29 of the outer ring 19 may be integrally formed with an annular projection 38 projecting in the axial direction and positioned radially inwardly of the ring as shown in FIG. 3. Such projection prevents the front face of the cylindrical portion 29 of the outer ring 19 from coming into intimate contact with the entire inside bottom surface of the pressure chamber 24 to close the fluid inlet 25.

With the construction described above, the tapered roller bearing 10 is completely accommodated in the bore of the outer member 19. The outer member 19 and the inner member 20 joined thereto thus provide a compact preload-adjustable bearing device in the form of a unit having a minimized axial dimension, giving a sufficient axial dimension to the surface of the outer ring 12 for guiding the ring 12 in sliding contact with the outer member 19.

Under the static pressure of fluid fed to the pressure chamber 24 in accordance with the preload setting conditions of the bearing, the outer ring 12 is axially slidable with high responsiveness and smoothness to ensure proper adjustment of the preload on the bearing as desired.

The O-rings 32 and 33 sealing the clearance between the sliding contact surfaces for the axial sliding movement of the outer ring 12 are located outwardly of the pressure chamber 24 at positions remote from the chamber 24 to the greatest possible extend. Consequently the oil fed to the pressure chamber 24 as the pressure fluid is supplied also to the clearances 30 and 31 between the sliding contact surfaces at the inner and outer peripheries of the outer ring 12. The lubrication afforded by the oil in the clearances 30 and 31 serves to effect the sliding motion of the ring 12 with improved smoothness and gives an enhanced damping effect to absorb vibrations of the bearing.

When the outer ring 12 has a relatively small thickness such that the pressure of oil forced into the clearance 30 between the sliding contact surfaces at the outside periphery of the outer ring is likely to deform the outer ring 12 by constricting the ring diametrically thereof, the O-rings 32 and 33 may be disposed in one plane perpendicular to the axis of the shaft, eliminating deviation of one ring from the other in the axial direction, whereby the possible deformation described above can be avoided.

Figure 4:
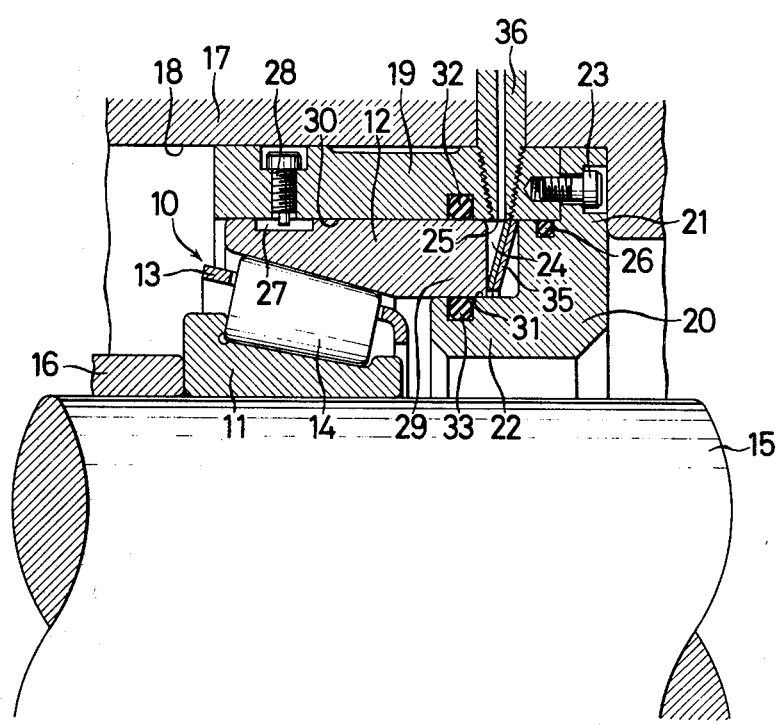
FIG. 4 is a front view in vertical section showing another embodiment of this invention, the lower half of the device below its center line being omitted.

The embodiment shown in FIG. 4 includes a dished spring 35 disposed in the pressure chamber 24 in place of the spacer ring 34 or annular projection 37 or 38. The dished spring 35 always biases the outer ring 12 in the axial direction with a force smaller than the preload given to the outer ring 12 by the pressure fluid in the pressure chamber 24. When the fluid pressure providing the preload on the bearing drops abruptly for one cause or another, the spring 35 serves to prevent the marked decrease in the preload. The spring also acts to always maintain a minimum amount of preload to be given to the bearing. In place of the dished spring, a coiled spring or some other suitable means is of course usable as such biasing means.

What is claimed is:

1. A device including a preload-adjustable roller bearing adapted to carry a radial load and a thrust load at the same time, the device comprising:

a sleeve-like outer member to be fixedly fitted in a bore of a housing, an annular inner member of L-shaped section having a flange secured to one end of the outer member, the inner member providing an annular pressure chamber between the outside peripheral surface of its cylindrical portion and the inside surface of the outer member for receiving a pressure fluid, an outer ring constituting the bearing and fitted in the outer member in contact with the inside surface thereof slidably only in an axial direction thereof, the outer ring having a cylindrical portion axially integrally extending from its one end having a smaller inside diameter, the outer ring having its cylindrical portion slidably fitted in the pressure chamber so as to be subjected directly to the pressure of the fluid, sealing means oiltightly sealing a clearance between the outside surface of the outer ring and the inside surface of the outer member in sliding fitting contact with each other, sealing means oiltightly sealing a clearance between the inside surface of the cylindrical portion of the outer ring and the outside surface of the cylindrical portion of the inner member in sliding fitting contact with each other, and guide means for permitting sliding movement of the outer ring only in the axial direction thereof.

2. A device as defined in claim 1 wherein the sealing means are located respectively at positions remote fromm the pressure chamber to the greatest possible extent so that the fluid within the pressure chamber is applicable to the outside and inside peripheral surfaces of the outer ring.

3. A device as defined in claim 1 wherein both the sealing means are disposed in the same plane perpendicular to the axis.

4. A device as defined in claim 1 further including spacer means disposed within the pressure chamber to prevent the cylindrical portion of the outer ring from closing an inlet for feeding the pressure fluid.

5. A device as defined in claim 1 further including biasing means disposed within the pressure chamber to always bias the outer ring in the direction in which the bearing is preloaded.

* * * * *